March 31, 1931.                C. S. BURNETT                    1,798,185
                          AUTOMATIC POPPET VALVE CONTROL
                       Filed Nov. 26, 1928        2 Sheets-Sheet 1

Inventor.
Charles S. Burnett
By
Attorney.

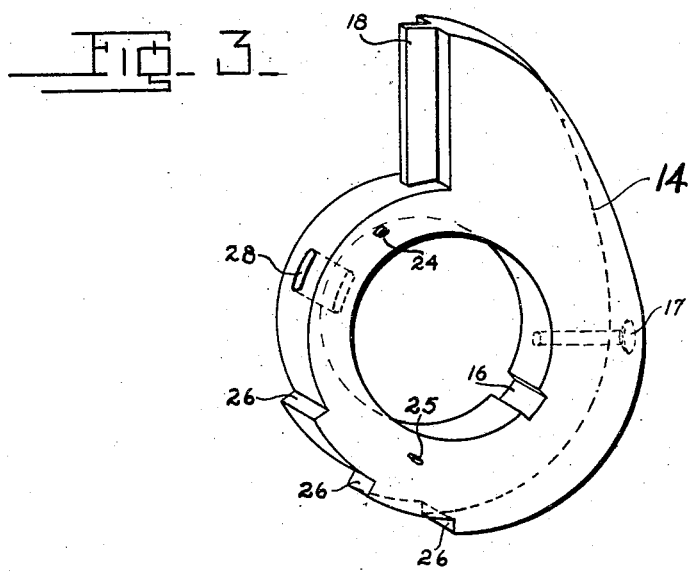//
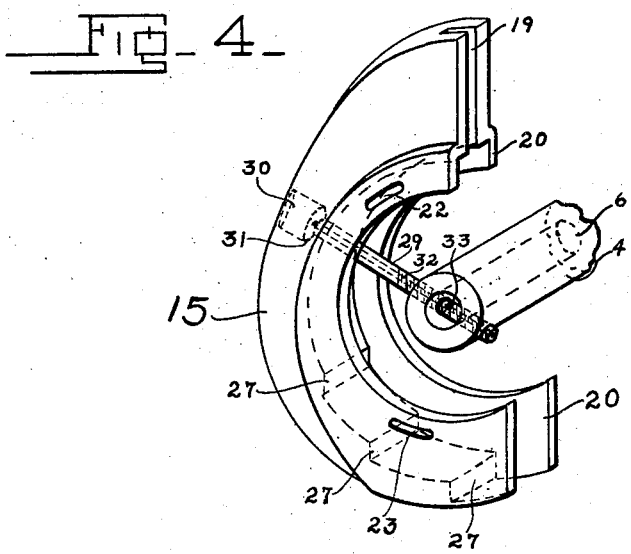

Patented Mar. 31, 1931

1,798,185

UNITED STATES PATENT OFFICE

CHARLES S. BURNETT, OF SAN FRANCISCO, CALIFORNIA

AUTOMATIC POPPET-VALVE CONTROL

Application filed November 26, 1928. Serial No. 321,999.

(GRANTED UNDER THE ACT OF MARCH 3, 1883, AS AMENDED APRIL 30, 1928; 370 O. G. 757)

This invention described herein may be manufactured and used by or for the Government for governmental purposes, without the payment to me of any royalty thereon.

My invention relates to a means for controlling the valves of engines and more particularly to a variable valve actuating cam and governor control therefor, the former so constructed, that the dwell, or, in other words, the circumferential extent of the dwell, thereof, may be varied by the latter.

The cam is subject to being used in any device wherein cams are employed but is particularly adaptable to use with engines to actuate the intake and exhaust valves thereof, a multiplicity of such cams capable of being positioned at any desired angle of their plane of rotation on the same cam shaft, so as to be rotated thereby and controlled by the same varying agency.

Not only is the dwell susceptible of being altered manually but it may be changed during the rotation of the cam by means of a governor controlled mechanism or the like, the latter varying the contour of the cam according as the speed of the device operating the mechanism increases or decreases.

The cam is composed of two parts, one intended to be rigidly secured to the cam shaft and the other designed to be moved relative to the first part so as to effect a variation in the cam dwell.

The movable part is engaged by a pin carried on a rotatable, but axially fixed rod that is journalled within the cam shaft and capable of being rotated by the governing means as the speed varies. The governing means produces a relative rotation of the rod with respect to the cam shaft as the speed of the device operating the means fluctuates with the result that the pin is moved to rotate the movable part about the cam shaft as a center to vary the dwell so as to effect a greater or lesser duration of the exhaust or intake period as the case may be.

One object of my invention is to provide a cam whose dwell may be varied automatically by the operation of the device in which it is embodied.

Another object of my invention is to provide a valve actuating cam to vary automatically the time of opening and closing of a valve in accordance with the speed of the driving mechanism without regard to the load carried by the driving mechanism.

A further object is to effect the last mentioned object without increasing or decreasing the lift of the valve.

Another object of the invention is to provide a cam which varies the duration of the exhaust or inlet period of the valves of an internal combustion engine as a function of the engine speed.

An important object is to make it possible and practicable, first, at high speeds, to delay the time of closing the intake valve of internal combustion engines using gas fuel for the purpose of taking advantage of the inertia of the inrushing gas so as to permit the gas to enter against the initial retarding pressure due to the return movement of the piston on its compression stroke; second, at low speeds to advance the time of closing the intake valve to prevent loss of gas already entered into the combustion chamber from being forced out by the piston on its compression stroke; third, at high speeds to advance the opening time of the exhaust valve to allow time for full exhaust after combustion and expansion; and fourth, at low speeds to delay the unnecessarily early opening of the exhaust valve.

In order that my invention may be readily understood, reference is had to the accompanying drawings forming a part of this specification in which—

Figure 3 represents a perspective of that part of the cam which is fixed with respect to the cam shaft.

Figure 4 is a perspective of the movable cam part.

Figure 1:
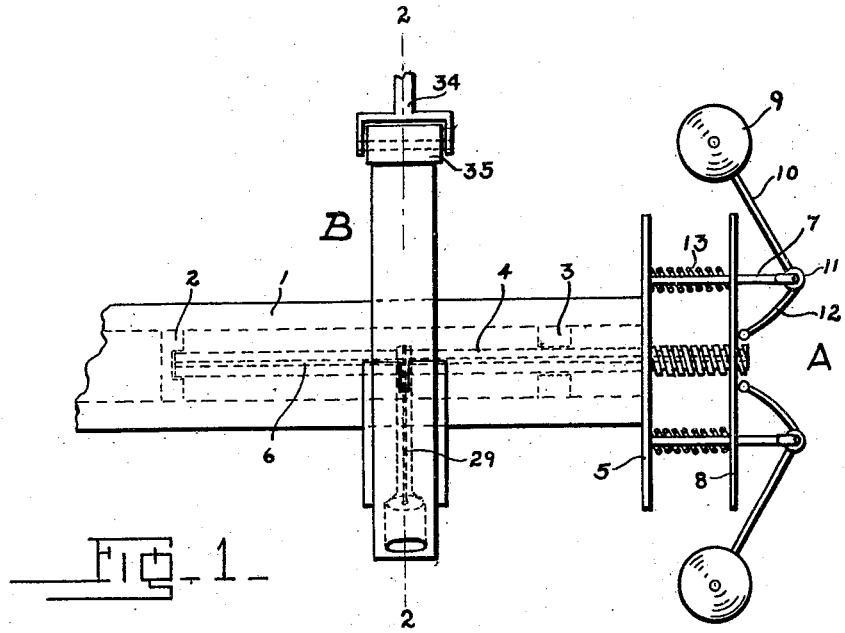
Figure 1 is an assembly view in elevation of the cam and governor control.
Figure 2:
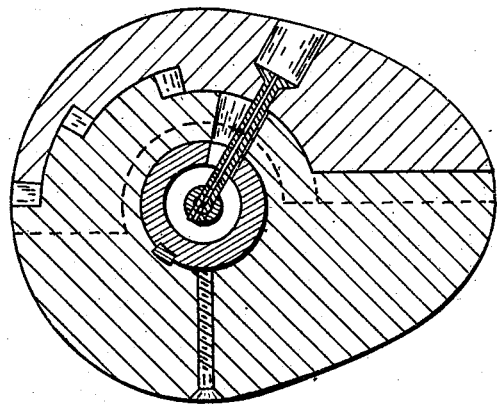
Figure 2 is a section at 2—2 on Figure 1.

Suitably journalled in an engine so as to be rotated thereby is a hollow cam shaft 1 carrying a governor mechanism, broadly designated as A, positioned thereon so as to be capable of being rotated with the cam shaft. The hollow shaft is provided with a step bearing 2 and a second bearing 3 provided to support a rod 4 rotatably but axially fixed. The rod is spirally threaded at its outer end and is provided with an oil passage 6 within it for purposes which will hereinafter appear. A disc 5 provided with a multiplicity of pins 7 is fixed to the end of the cam shaft in any desired manner so as to rotate therewith, the pins designed to support a second disc 8 which is capable of axial but non-rotative movement with respect to the shaft. The disc 8 is spirally threaded to receive the spiral threads on the end of the rod so that axial movement of the disc 8 produces a rotation of the rod 4. Carried by two of the pins 7 are governor balls 9 which are designed to be affected by the centrifugal force developed by the rotation of the shaft 1. The balls carry links 10 which are pivoted about the pin 7 through the intermediary of hinges 11, and also fingers 12, so fashioned that as the balls move outwardly, due to centrifugal force acting thereon, the fingers are caused to press against the disc 8 to move it axially with respect to the shaft 1. Springs 13 positioned around the pins 7 and interposed between discs 5 and 8 tend to urge the disc 8 into its position farthest removed from the end of the shaft 1 or in other words from disc 5. Movement of the disc 8, effected by a variation in the speed of rotation of cam shaft 11, because of the threaded relation of disc 8 and rod 4 brings about a rotation of said rod to produce a variation in the extent of the dwell of the cam, broadly designated as B, as will be more clearly hereinafter set forth.

The cam is comprised by two parts 14 and 15, the part 14 designed to be positioned on the cam shaft and fixed relatively thereto, by means of a keyway 16, and a set-screw 17, and the part 15, constructed so as to be capable of rotation about the shaft 1 for a purpose that will appear as the description progresses. The fixed cam part is furnished with a tongue 18 which when the two parts are together is received in a groove 19 in the movable cam part 15, and which in certain positions of the parts forms a portion of the cam dwell. Part 15 is provided with a circumferential skirt flange 20 designed to overlie cam part 14 and form a bearing for the part 15 as it rotates about part 14, that portion of 14 on which the skirt bears being the arc of a circle whose center is the mid point of the cam shaft, consequently the movement of cam part 15 about part 14 constitutes circular motion about the said shaft. For the purpose of guiding the movable part 15 with respect to the fixed part 14 slots 22 and 23 are provided in the skirt 20 for the purpose of accommodating pins 24 and 25 with which the fixed cam part is provided. For controlling the extent of rotation of one part with respect to the other steps are formed in the part 14 to complement similar steps 27 in the part 15. When the dwell of the cam is the smallest, that is, when the tongue 18 is inserted to its greatest extent in the groove 19 the steps are removed in a circumferential manner from each other or in other words a space exists between them. The fixed part 14 carries a slot 28 designed to accommodate a pin 29 on rod 4 for a purpose which presently will appear. The pin 29 is affixed to the rod 4 and passes through slot 28 in fixed part 14 into movable part 15 so that when rod 4 is rotated part 15 is constrained to move with respect to part 14, the pin 29 in this movement sliding along the slot 28, and skirt 20 riding about cam part 14.

To simplify the assemblage of the cam upon the cam shaft the pin 29 is threaded so as to be capable of being screwed into a threaded hole in the rod 4. In order that access may be had for this operation, cam part 15 is bored out at 30 and provided with an internal shoulder 31 for the reception of a head on the pin.

To provide for the lubrication of the movable parts the rod 4 as before-mentioned is furnished with an opening 6 through which oil may be introduced in any known manner. The pin 29 likewise bears an oil passage 32 which is in communication, through holes 33 drilled therein, with the passage in the rod. Oil introduced to the passage in the rod 4 is impelled against and into the movable parts by centrifugal force with the result that surfaces subject to friction are thoroughly lubricated. The operation of the device is as follows:

As the speed of the cam shaft varies due to fluctuations in the rate of rotation of the engine crank shaft the governor balls are moved axially with respect to the shaft and transmit this motion to disc 8 through the intermediary of links 10 and fingers 12. Movement of the disc 8 due to its threaded relation with rod 4 brings about a relative rotation of the rod with respect to the cam shaft and this movement is transmitted by means of the pin 29 to the movable cam part to withdraw or further insert the tongue 18 in the groove 19 to vary the dwell of the cam. Variation in the dwell of the cam effects a greater or lesser period of intake or exhaust of the engine valves due to the fact that the valves receive their actuation from the valve tappet 34 which rides over the cam surface on roller 35.

From the foregoing description it can be readily seen that my invention is particularly adapted to the control of engine valves because any number of cams are susceptible of being stationed on the same cam shaft in diverse angular relation and when so positioned are capable of being influenced by the same actuating rod through a multiplicity of pins affixed thereto.

Having described my invention, what I claim as new and wish to secure by Letters Patent is:

1. In an articulated variable cam, one part designed to be fixed and carrying a tongue which in certain relations of the parts constitutes a portion of the cam dwell, a second part oscillatable with respect to the first part and provided with a groove and a circumferential skirt flange, the groove receiving therein the tongue, and the flange overlying the first mentioned part and forming a bearing in the oscillation of the second mentioned part.

2. In a segmental cam, a fixed part and an oscillatable part, a slot in the fixed part, a pin fixed to the movable part and projecting through the slot and means whereby the pin may be oscillated to effect an oscillation of the second mentioned part to vary the dwell of the cam.

3. In an articulated variable dwell cam, a fixed part provided with guide pins, an oscillatable part furnished with guide slots and a skirt flange, the pins adapted to engage in the slots and the flange designed to embrace the fixed part whereby the parts are guided and journalled with respect to each other.

4. An articulated variable dwell cam comprising a fixed and a circumferentially adjustable part and means including a hollow rod associated therewith through which the surfaces of the movable parts are lubricated and relatively adjusted.

5. A segmental cam comprising a fixed and a movable part, a tongue on the fixed part, a groove on the movable part, the tongue sliding in the groove and forming part of the cam dwell in certain positions of the parts.

6. In an articulated variable dwell cam, a fixed part, and a movable part provided with a skirt flange, the latter encompassing the fixed part and constituting a bearing for the movable part.

CHARLES S. BURNETT.